US009001312B2

(12) United States Patent  
Matsubara et al.

(10) Patent No.: US 9,001,312 B2  
(45) Date of Patent: Apr. 7, 2015

(54) LIGHT SCANNING APPARATUS AND SEPARATION DISTANCE MEASUREMENT APPARATUS

(75) Inventors: Hiroyuki Matsubara, Seto (JP); Chie Toyoda, Nagoya (JP); Tamotsu Mizuno, Chita-gun (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 220 days.

(21) Appl. No.: 13/052,552

(22) Filed: Mar. 21, 2011

(65) Prior Publication Data

US 2011/0235019 A1     Sep. 29, 2011

(30) Foreign Application Priority Data

Mar. 23, 2010    (JP) ................................ 2010-066916

(51) Int. Cl.  
     *G01C 3/08*         (2006.01)  
     *G01S 17/93*        (2006.01)  
     *G01S 7/481*        (2006.01)  
     *G01S 17/10*        (2006.01)  
     *G01S 17/42*        (2006.01)  
     *G02B 26/10*       (2006.01)

(52) U.S. Cl.  
     CPC ............. *G01S 17/936* (2013.01); *G01S 7/4814* (2013.01); *G01S 7/4817* (2013.01); *G01S 17/10* (2013.01); *G01S 17/42* (2013.01); *G02B 26/105* (2013.01)

(58) Field of Classification Search  
     USPC ....................................... 356/5.01; 359/212.2  
     See application file for complete search history.

(56) References Cited

U.S. PATENT DOCUMENTS

| 4,898,437 | A | * | 2/1990 | Brueggemann | ............ 359/217.1 |
| 5,132,524 | A | * | 7/1992 | Singh et al. | ............. 235/462.39 |
| 5,894,123 | A | | 4/1999 | Ohtomo et al. | |
| 2002/0018273 | A1 | * | 2/2002 | Iizuka | ............................ 359/198 |
| 2008/0192228 | A1 | * | 8/2008 | Eaton | ............................ 356/5.01 |

FOREIGN PATENT DOCUMENTS

| JP | A-62-8119 | 1/1987 |
| JP | A-63-287816 | 11/1988 |
| JP | A-H01-289909 | 11/1989 |
| JP | A-1-306813 | 12/1989 |

(Continued)

OTHER PUBLICATIONS

Jul. 23, 2013 Office Action issued in Japanese Patent Application No. 2010-066916 (with translation).

*Primary Examiner* — Luke Ratcliffe  
*Assistant Examiner* — Vicente Rodriguez  
(74) *Attorney, Agent, or Firm* — Oliff PLC

(57) ABSTRACT

A light scanning apparatus including a light source for emitting light in a direction different from a direction orthogonal to the reference direction, and a rotating reflection body that rotates about an axis inclined at an inclination angle φ to the reference direction and includes at least one reflecting surface that is disposed in a direction intersecting obliquely with the axis and reflects light incident on the reflecting surface at an incident angle θ. A specific scanning direction is a direction intersecting at an angle to the reference direction and the rotation axis inclination angle φ≠0°. The inclination angle φ is predetermined according to the incident angle θ such that deviation of the scanning beam reflected by the reflecting surface is smaller than the deviation of the scanning beam that would be obtained with the inclination angle φ of the rotation axis 0°.

6 Claims, 11 Drawing Sheets

(56) References Cited

FOREIGN PATENT DOCUMENTS

| JP | A-3-68914 | 3/1991 |
| JP | A-H04-024776 | 1/1992 |
| JP | A-8-285596 | 11/1996 |
| JP | A-9-257478 | 10/1997 |
| JP | A-9-274076 | 10/1997 |
| JP | A-2002-214559 | 7/2002 |
| JP | A-2004-138530 | 5/2004 |
| WO | WO 97/16703 A1 | 5/1997 |

* cited by examiner

ND SEPARATION DISTANCE MEASUREMENT APPARATUS

LIGHT SCANNING APPARATUS AND SEPARATION DISTANCE MEASUREMENT APPARATUS

CROSS-REFERENCE TO RELATED APPLICATION

This application is based on and claims priority under 35 USC 119 from Japanese Patent Application No. 2010-066916 filed on Mar. 23, 2010 the disclosure of which is incorporated by reference herein.

BACKGROUND

1. Technical Field

The present invention relates to a light scanning apparatus and a separation distance measurement apparatus.

2. Related Art

Existing light scanning apparatuses for scanning a light beam in a specific direction are employed in various fields, including in image forming apparatuses such as laser printers, and separation distance measurement apparatuses such as laser radar apparatuses. There is, for example, a proposal for a reflection measurement apparatus employed for vehicle separation distance control that performs two dimensional scanning using a rotating multifaceted mirror equipped with plural reflecting surfaces of differing tilt angles, and for a vehicle separation distance control apparatus employing such as reflection measurement apparatus (see, for example, Japanese Patent Application Laid-Open (JP-A) No. 9-274076). In the apparatus of JP-A No. 9-274076, a laser beam is illuminate from obliquely above a inclined reflecting surface of a rotating multifaceted mirror, and plural beams reflected by respective reflecting surfaces are scanned.

However, when two dimensionally scanning emission beams using a rotating multifaceted mirror equipped with inclined reflecting surfaces as described in JP-A No. 9-274076, the scanning angle range in the vertical direction (called the "elevation angle") within a vertical flat plane orthogonal to the center of the measurement area differs at the two ends of the measurement area, generating distortion in the trapezoidal measurement area, called "vertical distortion". In the apparatus of JP-A No. 9-274076, the laser beam is caused to be incident on the tilted reflecting surface from obliquely above, and vertical distortion is only reduced in a narrow range of bearing angles of 20° or less.

SUMMARY

In consideration of the above circumstances and an objective of the present invention is to provide a light scanning apparatus and separation distance measurement apparatus capable of setting the scanning path track of the scanning beam reflected by the reflecting surface more flexibly than is the case when the rotation axis of the rotating reflection body equipped with the reflecting surface is an inclination angle $\phi$ of 0°.

In order to achieve the above objective, aspects the present invention are configured as set out below.

A first aspect of the present invention is a light scanning apparatus including: a light source for emitting light in a direction different from a reference direction and different from a direction orthogonal to the reference direction; and a rotating reflection body that rotates about a rotation axis inclined at an inclination angle $\phi$ to the reference direction and includes at least one reflecting surface that is disposed in a direction intersecting obliquely with the rotation axis and reflects light from the light source incident on the reflecting surface at an incident angle $\theta$. In the light scanning apparatus of the first aspect a specific scanning direction is a direction intersecting at a predetermined angle to the reference direction and the rotation axis inclination angle $\phi \neq 0°$. The inclination angle $\phi$ is also predetermined according to the incident angle $\theta$ such that deviation of the scanning beam reflected by the reflecting surface from the specific scanning direction is smaller than the deviation of the scanning beam from the specific scanning direction that would be obtained with the inclination angle $\phi$ of the rotation axis=0°.

A second aspect of the present invention is the light scanning apparatus of the first aspect, wherein the inclination angle $\phi$ is predetermined according to the incident angle $\theta$ such that an elevation angle is substantially fixed when the reference direction is the vertical direction and the scanning direction is in the horizontal direction or a direction either above or below the horizontal direction.

A third aspect of the present invention is the light scanning apparatus of the first aspect, wherein the inclination angle $\phi$ is predetermined according to the incident angle $\theta$ such that a bearing angle is substantially fixed when the reference direction is the horizontal direction and the scanning direction is in the vertical direction.

A fourth aspect of the present invention is the light scanning apparatus of any one of the first aspect to the third aspect, wherein the rotation axis is within a plane containing the reference direction, and the incident direction of light incident at the incident angle $\theta$ onto the reflecting surface.

A fifth aspect of the present invention is a separation distance measurement apparatus including: a light output section including the light scanning apparatus of any one of the first aspect to the fourth aspect wherein the light source is a light source for emitting a laser beam; a light detection section for detecting laser light that has been output from the light output section and reflected by an obstacle present either in front of or to the side of the separation distance measurement apparatus; and a separation distance computation section that computes the separation distance to the obstacle from the delay time of the laser light that was output from the light output section and detected by the light detection section.

A sixth aspect of the present invention is the separation distance measurement apparatus of the fifth aspect, wherein the light detection section detects the laser light reflected by the obstacle as re-reflected by the rotating reflection body of the light scanning apparatus.

The following effects can be exhibited according to the present invention of the above aspects.

According to the first aspect of the present invention the scanning path track of the scanning beam reflected by the reflecting surface can be set more flexibly than would be the case when the rotation axis of the rotating reflection body equipped with the reflecting surface were to be set with an inclination angle $\phi$ of 0°. Namely, when the inclination angle $\phi$ is 0°, the scanning method is fixed and it is not possible to freely set a scanning path trace. In contrast thereto, predetermining the inclination angle $\phi$ ($\neq 0$) according to the incident angle $\theta$ enables the separation distance to be set at a given direction for each of the scanning direction bearings.

For example, for a "desired scanning path trace" with the scanning beam facing a specific set scanning direction, by predetermining the inclination angle $\phi$ ($\neq 0$) according to the incident angle $\theta$ such that the deviation of the scanning beam reflected by the reflecting surface with respect to the specific scanning direction is small, the scanning path trace can be made to more closely approximate to the desired scanning path trace.

When the scanning direction faces downwards, the scanning path trace can be made such that the scanning beam wraps around on itself at the two end portions of the scanning range so as to scan around the periphery of the light scanning apparatus, namely the scanning direction can be set to a given scanning direction for each of the scanning bearings so as to achieve a scanning path trace of the "desired scanning path trace". Similarly, the scanning path trace can also be made to approximate to the desired scanning path trace by predetermining the incident angle θ (≠) according to the incident angle θ such that the deviation of the scanning beam reflected by the reflecting surface is small with respect to a specific scanning direction.

Furthermore, the beam emitted from the light source is made to be incident to the reflecting surface from a direction different to the reference direction and different from a direction orthogonal to the reference direction (obliquely incident). Consequently, with a rotating reflection body provided with plural (N individual) reflecting surfaces, a full scan angle can be realized of (360°/N), this not being possible with vertical incidence in which the light is incident from the reference direction. Moreover, a full scan angle of 180° or greater can be achieve, this also not being possible with light is incident from a direction orthogonal to the reference direction in lateral incidence.

According to the second aspect of the present invention, when the "desired scanning path trace" is one in which the scanning beam is always facing in a specific scanning direction (in the horizontal direction or either above or below the horizontal direction), the elevation angle can be made substantially fixed in comparison to cases in which the inclination angle φ of the rotation axis is 0°.

According to the third aspect of the present invention, when the "desired scanning path trace" is one in which the scanning beam is always facing in a specific scanning direction (in the vertical direction), the bearing angle can be made substantially fixed in comparison to cases in which the inclination angle φ of the rotation axis is 0°.

The fourth aspect of the present invention facilitates setting of the inclination angle φ (≠0) according to the incident angle θ, namely scanning path trace distortion correction.

According to the fifth aspect of the present invention, the scanning path track of the scanning beam reflected by the reflecting surface can be set more flexibly than would be the case were the rotation axis of the rotating reflection body equipped with the reflecting surface to be at an inclination angle φ of 0°.

According to the sixth aspect of the present invention, the light reception sensitivity in the light detection section can be further raised.

BRIEF DESCRIPTION OF THE DRAWINGS

Exemplary embodiments of the present invention will be described in detail based on the following figures, wherein.

DETAILED DESCRIPTION

Explanation follows regarding an exemplary embodiment of the present invention, with reference to the drawings. Explanation follows regarding an exemplary embodiment in which a light scanning apparatus and a separation distance measurement apparatus of the present invention are applied to a vehicle mounted laser radar apparatus and separation distance measurement apparatus. However, the light scanning apparatus and the separation distance measurement apparatus of the present invention are, as stated below, applicable to various applications, and are not limited to application to a vehicle mounted laser radar apparatus.

Outline Configuration of Vehicle Mounted Laser Radar Apparatus

Figure 1:
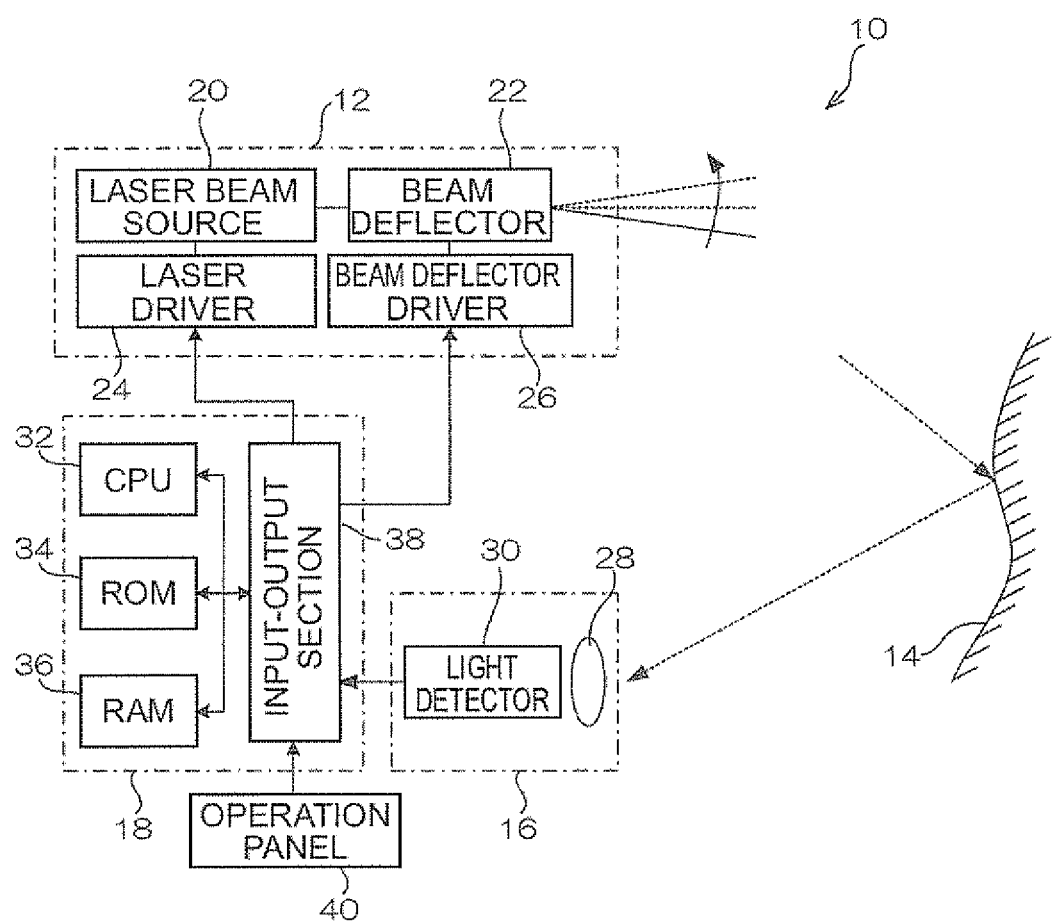
FIG. 1 is a schematic diagram showing a configuration of vehicle mounted laser radar apparatus according to a present exemplary embodiment.

FIG. 1 is a schematic diagram showing a configuration of a vehicle mounted laser radar apparatus of an exemplary embodiment of the present invention. As shown in FIG. 1, a laser radar apparatus 10 is configured including: a light output section 12 for outputting a laser beam; a light detection section 16 for detecting laser light reflected by an obstacle 14 in a monitoring region; and a controller 18 for controlling each of the sections in the laser radar apparatus 10.

The light output section 12 includes a laser beam source 20 for emitting a laser beam and a beam deflector 22 for deflecting the incident laser beam. The laser beam source 20 is configured with a semiconductor laser, such as a laser diode (LD). The beam deflector 22 includes a movable mirror (not illustrated in FIG. 1) for changing the light path of the incident laser beam by reflection. More precise details regarding the construction of the beam deflector 22 are explained later. The laser beam source 20 is connected to a laser driver 24. The beam deflector 22 is connected to a beam deflector driver 26. The light detection section 16 is configured including a light converging lens 28 and a light detector 30.

The controller 18, similarly to an ordinary computer, includes a Central Processing Unit (CPU) 32 for performing control of the apparatus overall and various computations, Read Only Memory (ROM) 34 stored with various programs, such as an Operating System (OS), Random Access Memory (RAM) 36 for use as working space during program execution, and an input-output section (I/O port) 38. These sections are mutually connected together by a bus.

In the present exemplary embodiment, various monitoring programs are stored in the ROM 34, for the laser radar apparatus 10 to monitor a field of view region. The controller 18 functions as a distance measurement apparatus (analyzing apparatus) for computing the separation distance to an obstacle 14 from the delay time in a reflected pulse light, by execution of these monitoring programs.

The input-output section 38 is connected to each of the laser driver 24, the beam deflector driver 26 and the light detector 30. The input-output section 38 is connected to an operation panel 40 for operating the apparatus. Note that the controller 18 may be configured with a Hard Disk (HD) for storing various data, and with various drives for inputting various data. Configuration may be made such that a display device, such as a small display, is connected to the input-output section 38.

A brief explanation follows regarding operation of the laser radar apparatus 10 described above. The laser radar apparatus 10 starts to monitor the field of view region by starting detection scanning and the like when an instruction is input from the operation panel 40. The CPU 32 reads out a monitoring program from the ROM 34 and loads the monitoring program into the RAM 36. The CPU 32 then executes the loaded monitoring program using the RAM 36 as working space.

A control signal for driving the laser beam source 20 is first input from the controller 18 to the laser driver 24. The laser driver 24 generates a drive signal based on the input control signal. The laser beam source 20 is driven in pulse modulation according to the drive signal. Driving is performed such that, for example, laser light of a pulse width of about 10 nanoseconds (ns) is illuminated. The laser light pulse (referred to below simply as "laser beam") is emitted from the laser beam source 20 pulse modulated to a specific light emission intensity. The laser beam is controlled to the specific light emission intensity according to the separation distance to a surface to be scanned. The surface to be scanned referred to here is a surface illuminated by the laser beam set at the outermost extreme of a hypothetical monitoring region.

A control signal for driving the beam deflector 22 is input to the beam deflector driver 26 from the controller 18. The beam deflector driver 26 generates a drive signal based on the input control signal. The beam deflector 22 is driven based on the drive signal. Namely, the incident laser beam is reflected while the movable mirror (not shown in FIG. 1) in the beam deflector 22 is being rotated about a specific axis.

The laser beam emitted from the laser beam source 20 is deflected by the beam deflector 22, and illuminated towards the surface to be scanned. The laser beam illuminated towards the surface to be scanned is illuminated onto any obstacle 14 present within the monitoring region. The laser light reflected by the obstacle 14 (reflected light pulse) is converged by the light converging lens 28 of the light detection section 16, and detected by the light detector 30. The light detector 30 converts the detected light into an electrical signal and amplifies the signal. The amplified detection signal is input from the light detector 30 to the controller 18.

In the controller 18, the separation distance L (units: m) to the obstacle 14 is computed from the delay time τ (units: seconds) of the reflected light pulse and the speed of light c ($=3.0\times10^8$ m/s), using the relationship τ=2 L/c. Note that the delay time τ is the period of time from when a given laser light pulse was output from the laser beam source 20 until its reflected light pulse is detected by the light detector 30. The computed separation distance L to the obstacle 14 may be displayed on a display apparatus (not shown in the drawings) as required.

In the vehicle mounted laser radar apparatus described above, the light output section 12 corresponds to a "light scanning apparatus". In the following explanation, a vertical direction perpendicular to the road surface is referred to as a "reference direction", and a horizontal direction parallel to the road surface is referred to as a "specific scanning direction". Distinction is made, where appropriate between a horizontal direction referred to as a "primary scanning direction" and a vertical direction orthogonal to the horizontal direction referred to as a "secondary scanning direction"

Light Scanning Apparatus

Figure 2:
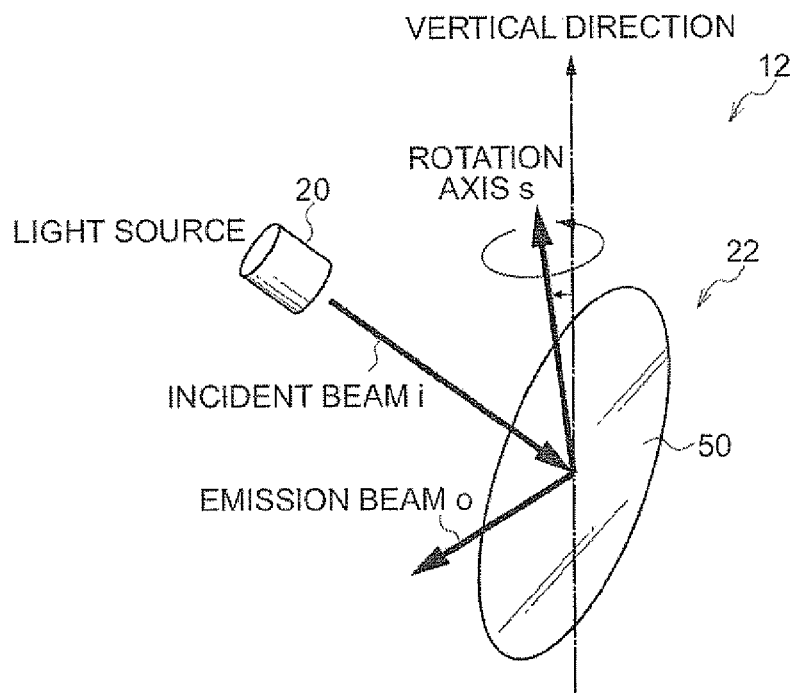
FIG. 2 is a schematic diagram showing a configuration of a light output section corresponding to a "light scanning apparatus"

Explanation now follows regarding an outline configuration of the light output section 12, with reference to FIG. 2. As stated above, the light output section 12 is equipped with the laser beam source 20 and the beam deflector 22. The beam deflector 22 is provided with a reflecting surface 50 that is not a plane orthogonal to a rotation axis s, shown by the solid arrow, and the reflecting surface 50 intersects with the rotation axis s at an angle. The reflecting surface 50 is not in a vertical plane that includes the vertical direction indicated by the single dot broken line in FIG. 2, and the reflecting surface 50 intersects with the vertical direction. Namely, the reflecting surface 50 is an inclined surface, tilted so as to intersect with both the rotation axis s and the vertical direction.

The laser beam source 20 is disposed obliquely above the beam deflector 22. The laser beam source 20 is modulation driven by a driver, not shown in the drawings, and illuminates a laser beam onto the reflecting surface 50. In the present exemplary embodiment the laser beam source 20 illuminates a laser beam (incident beam i) onto the tilting disposed reflecting surface 50, obliquely from above with a specific incident angle θ with respect to a normal to the reflecting surface 50. Namely, the reflecting surface 50 is not illuminated with illumination along the vertical direction from directly above, but is instead illuminated from a direction different to the vertical direction. The incident beam i is reflected by the reflecting surface 50 and emitted as a scanning beam (emission beam o). In the present exemplary embodiment the horizontal direction is the "specific scanning direction (primary scanning direction)", and the emission beam o is emitted in a substantially horizontal direction.

Figure 13A:
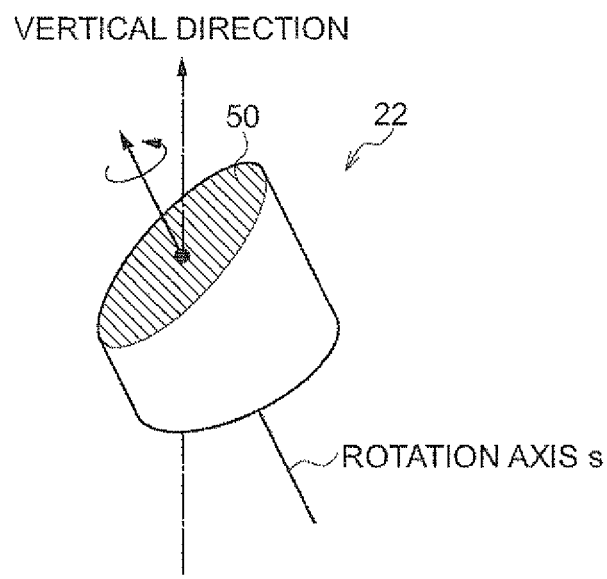
FIG. 13A and FIG. 13B are perspective views showing various embodiments of beam deflector.

The beam deflector 22 is a rotating reflection body, such as a rotating mirror, configured so as to be rotatable about the rotation axis s. For example, as shown in FIG. 13A, the beam deflector 22 can be configured with a circular cylinder shape rotatable about the rotation axis s. Such a circular cylinder is formed with a cut face, cut at an angle to the rotation axis s. The reflecting surface 50, shown by shading, can be formed by coating this cut face with a material of high reflectivity. Configuration may also be made with a flat circular plate shaped mirror supported on a support pillar.

In the beam deflector 22, the scanning beam (emission beam o) is deflected to a horizontal direction as the beam deflector 22 is rotating. The beam deflector 22 is driven by a driver, not shown in the drawings, and rotated about the rotation axis s. As this occurs, the reflecting surface 50 also rotates due to the beam deflector 22 rotating about the rotation axis s, changing the emission direction (bearing angle) of the emission beam o in the horizontal direction, and deflecting the incident laser beam. The rotation axis s of the beam deflector 22 is tilted to a specific angle (inclination angle φ) from the "vertical direction" that is the reference direction in the present exemplary embodiment.

Figure 3:
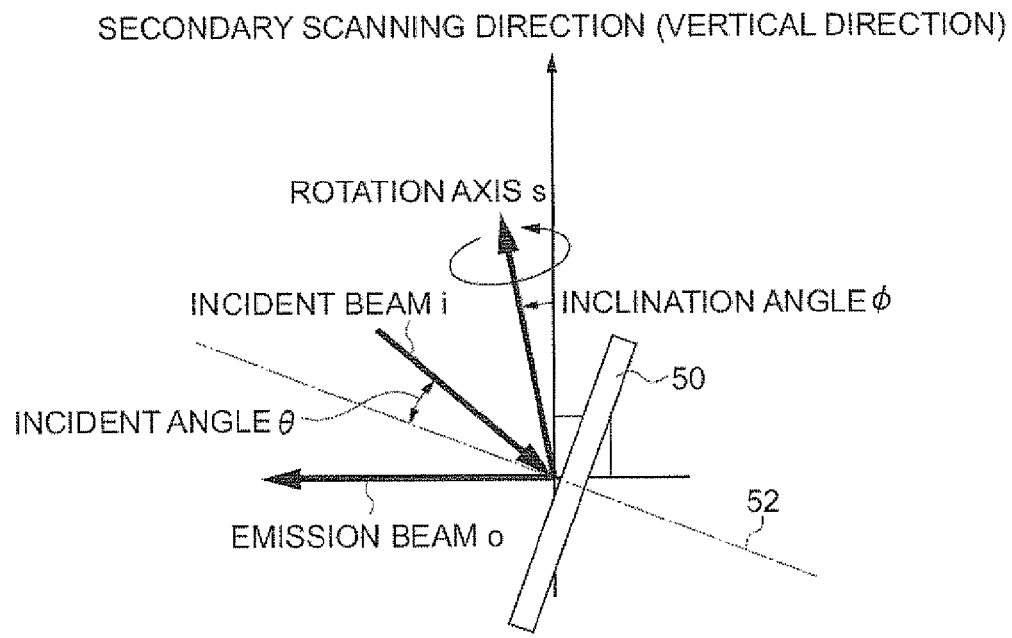
FIG. 3 is a diagram showing the relationship between the incident angle of light onto a reflecting surface and inclination angle of the rotation axis.

FIG. 3 shows a relationship between the incident angle θ of light onto the reflecting surface and the inclination angle φ of the rotation axis. FIG. 3 shows a relationship of the incident angle θ and the inclination angle φ at a bearing angle of 0°. In the present exemplary embodiment, a "desired scanning path trace" corresponds to a case in which the scanning beam always faces along a horizontal direction, namely a "fixed elevation angle" case. The angle formed between the scanning beam and the horizontal plane is the "elevation angle". Consequently, in order that the deviation of the scanning beam from the horizontal direction is small, the value of the inclination angle φ(≠0) is preset according to the value of the incident angle θ of the incident beam i to the reflecting surface 50.

Were the inclination angle φ to be 0°, the scanning method would become fixed and difficult to easily obtain the desired scanning path trace. By setting the value of the inclination angle φ (≠0) according to the value of the incident angle θ, as in the present exemplary embodiment, any distortion in the scanning path trace can be more easily corrected, in comparison to cases where the inclination angle φ=0°, and the scanning path trace actually traced by the scanning beam can be made to approximate to the "desired scanning path trace". Namely, the relationship between the incident angle θ and the inclination angle φ to approximate to the desired scanning path trace is derived in advance, and the laser beam source 20 and the beam deflector 22 are disposed such that this relationship is satisfied.

For example, when the laser beam source 20 and the beam deflector 22 are disposed at specific positions, this determines the angle with which the reflecting surface 50 and the vertical direction intersect, and this determines the value of the incident angle θ of the incident beam i to the reflecting surface 50. The incident angle θ is the angle formed between the incident beam i and the normal 52 to the reflecting surface 50. Similarly, the angle formed between the emission beam o and the normal 52 of the reflecting surface 50 is also θ. Consequently, in the following, sometimes the incident angle θ will be referred to as the incident and reflection angle θ as appropriate.

The rotation axis s of the beam deflector 22 is tilted, and the reflecting surface 50 is not a vertical face. The angle with which the reflecting surface 50 intersects the vertical direction is set according to the incident angle θ such that the emission beam o is emitted in a horizontal direction, which is the primary scanning direction. The inclination angle φ of the rotation axis s is set according to the incident angle θ such that the emission beam o (the scanning beam) traces out the desired scanning path trace.

The bearing along which the rotation axis s is tilted can be appropriately set according to the positional relationship between the laser beam source 20 and the beam deflector 22. For example, when the incident plane including the incident beam i and the normal 52 of the reflecting surface 50 is aligned along the bearing angle 0° direction, then setting of the inclination angle φ is facilitated by tilting the rotation axis s in the bearing angle 0° direction. For example, one option is to place the laser beam source 20 in front and above the beam deflector 22, and set the rotation axis s, the vertical direction and the incident beam i incident direction within the plane along the bearing angle 0° direction. In such a case the incident beam i incident from the bearing angle 0° direction is reflected by the reflecting surface 50, and the emission beam o is emitted horizontally along the bearing angle 0° direction.

In the description above, where the beam deflector 22 is equipped with an upward facing reflecting surface 50, an incident beam i incident from obliquely above is reflected forwards. In such a case the the rotation axis s is tilted towards the front side. Configuration may be made such that the reflecting surface 50 is configured facing downwards, and an incident beam i incident from obliquely below is reflected forwards. When the beam deflector 22 is equipped with a downwards facing reflecting surface 50, the rotation axis s is tilted in the opposite direction (towards the rear).

Scanning Path Trace with the Scanning Beam

Figure 4A:
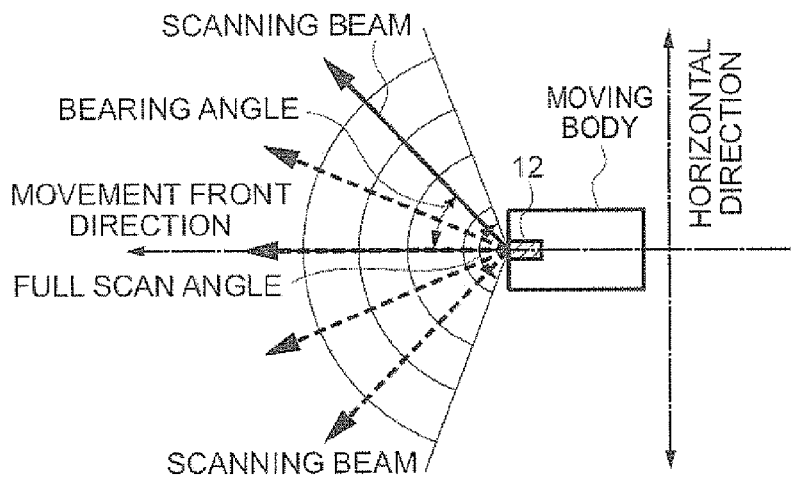
FIG. 4A to FIG. 4C are schematic diagrams for explaining respective examples of scanning path trace for horizontal scanning.
Figure 4B:
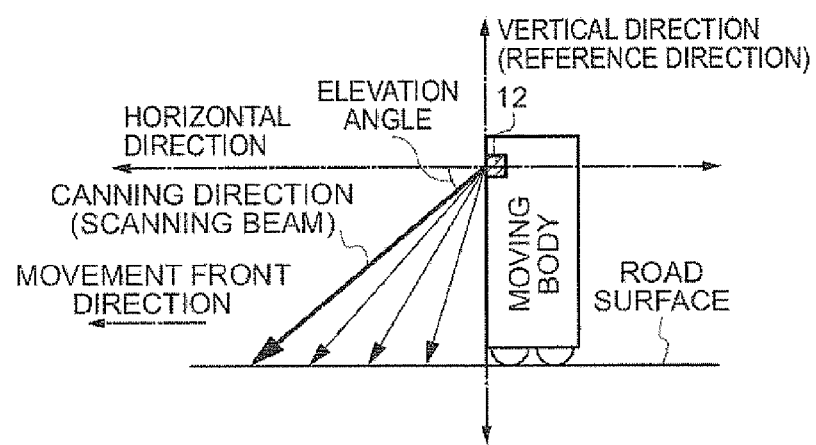
Figure 4C:
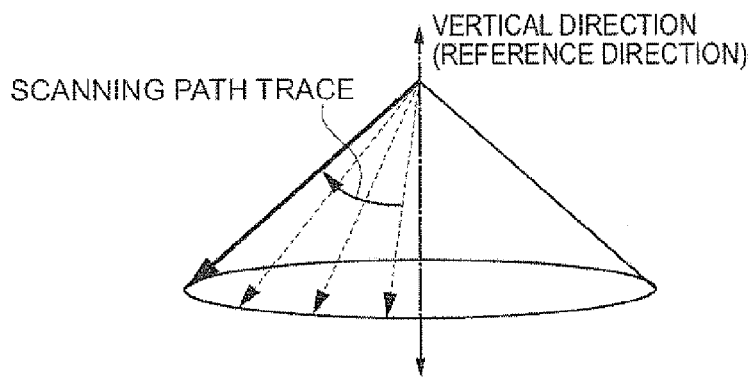

FIG. 4A to 4C are schematic diagrams for explaining the scanning path trace of horizontal scanning with the scanning beam. FIG. 4A is a view of the scanning beam as viewed from above. As shown in FIG. 4A, the scanning beam emitted from the light output section (light scanning apparatus) 12 is deflected, and the bearing angle (primary scanning angle α) in the horizontal direction of the scanning beam is changed. The dashed lines indicate the state after change, and the solid line indicates states prior to change. The scanning beam is scanned around a full scan angle (full scan angle β) in the horizontal direction (primary scanning direction) by rotating the beam deflector 22.

While explanation has been given in the above exemplary embodiment of a case in which scanning is performed in the horizontal direction, in the light scanning apparatus of the present invention, the scanning path trace can be flexibly set. The "reference direction" is also not limited to the vertical direction perpendicular to the road surface, and the "specific scanning direction" is not limited to the horizontal direction. For example, as shown in FIG. 4B, the specific scanning direction of the light output section (light scanning apparatus) 12 may be configured to face out below the horizontal plane. In such cases, as shown in FIG. 4C, the scanning path trace with the scanning beam is along a curved plane forming a side face of a circular cone. As can be seen from FIG. 4C, a full scan angle β of 360° may be permitted. Configuration may be made such that the specific scanning direction faces out above than the horizontal plane.

For cases where the specific scanning direction faces downwards, similarly to cases where the "primary scanning direction" is the horizontal direction, the "desired scanning path trace" can also be configured such that the scanning beam always faces in a fixed direction, namely in "fixed elevation angle". Accordingly, the value of the inclination angle φ (≠0) is preset according to the value of the incident angle θ such that deviation of the scanning beam from the specific scanning direction is made small.

Explanation has been given in the above exemplary embodiment of a case in which the "desired scanning path trace" is for the scanning beam to always face in a scanning direction with a fixed elevation angle to the horizontal direction. However, the "desired scanning path trace" can be configured with the scanning path trace set with a scanning direction selected for each of the scanning direction bearings. For example, when the "specific scanning direction" is below the horizontal plane, configuration may be made such that the scanning beam scans the periphery of the light scanning apparatus and wraps around on itself at both end portions of the scanning range. Such a scanning path trace may be used to configure the "desired scanning path trace". In such cases too, the value of the inclination angle φ (≠0) is preset according to the value of the incident angle θ such that deviation of the scanning beam from the specific scanning direction is as made small.

Figure 5A:
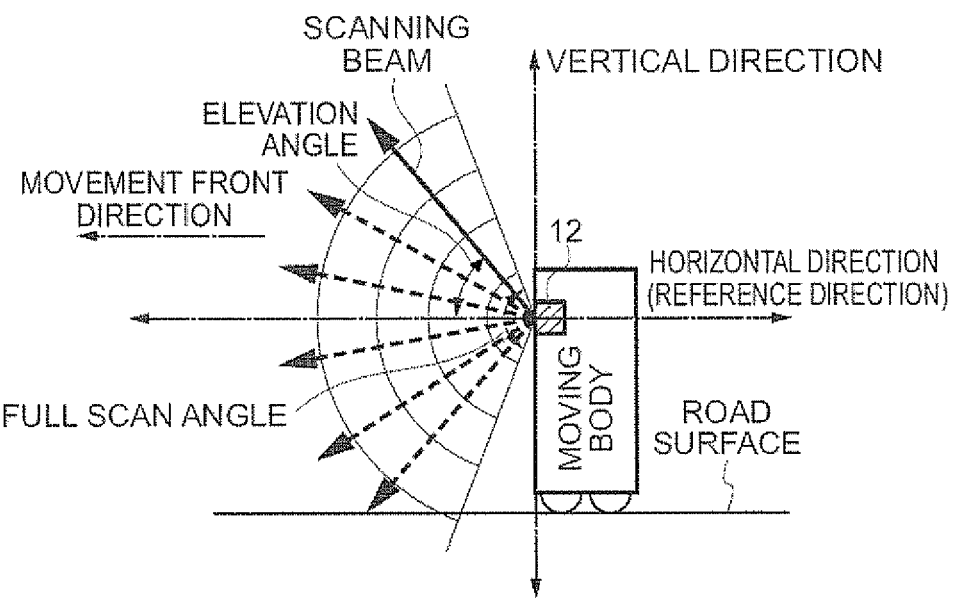
FIG. 5A and FIG. 5B are schematic diagrams for explaining another example of a scanning path trace for vertical scanning.
Figure 5B:
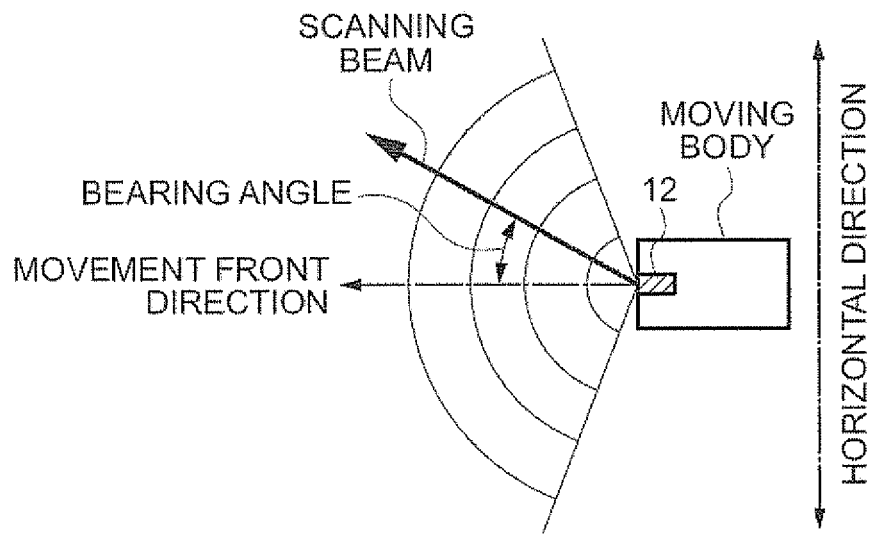

FIG. 5A and FIG. 5B are schematic diagrams for explaining the scanning path trace when vertically scanning the scanning beam. FIG. 5A shows the scanning beam as viewed from the side. In the exemplary embodiment described above a case is explained in which the vertical direction is set as the "reference direction" and scanning is in the horizontal direction. The light scanning apparatus of the present invention can flexibly set the scanning path trace, like this. As shown in FIG. 5B, configuration may be made such that a direction parallel to the road surface is the "reference direction". For example, application can made for changing the direction of movement direction when an obstruction is detected forwards in the direction of travel, such as in application to a robot sensor.

The scanning beam emitted from the light output section (light scanning apparatus) 12 is deflected in a vertical direction and the elevation angle of the scanning beam is changed in the vertical direction. The scanning beam is scanned through all the scan angles (full scan angle) in the vertical direction (primary scanning direction) by rotating the beam deflector 22. As can be seen from FIG. 5A and FIG. 5B, full scan angle of up to 180° may be permitted. The "desired scanning path trace" can be configured such that the scanning beam always faces in a fixed direction (the "vertical direction" here), namely with a "fixed bearing angle". In such cases, the value of the inclination angle $\phi$ ($\neq 0$) is preset according to the value of the incident angle $\theta$ such that the deviation of the scanning beam from the specific scanning direction (the vertical direction) is made small.

Optimization of the Inclination Angle

Explanation follows of the effect of using a rotating multifaceted mirror as the beam deflector 22 and presetting the relationship between the incident angle $\theta$ and the inclination angle $\phi$. The rotating multifaceted mirror employed in a simulation is a four-faced polygon mirror with equal tilt angles for the four reflecting faces. A full scan angle of 90° or greater can be realized with the four-faced polygon mirror by setting the incident beam to be incident thereon obliquely from above. In the following, explanation is given of a case in which the "reference direction" is the vertical direction perpendicular to the road surface, and the "specific scanning direction" is in the horizontal direction. Consequently, this is an example of a case of a "desired scanning path trace" in which the scanning beam is always facing in a horizontal direction, namely for "elevation angle=0° (fixed)".

Figure 6A:
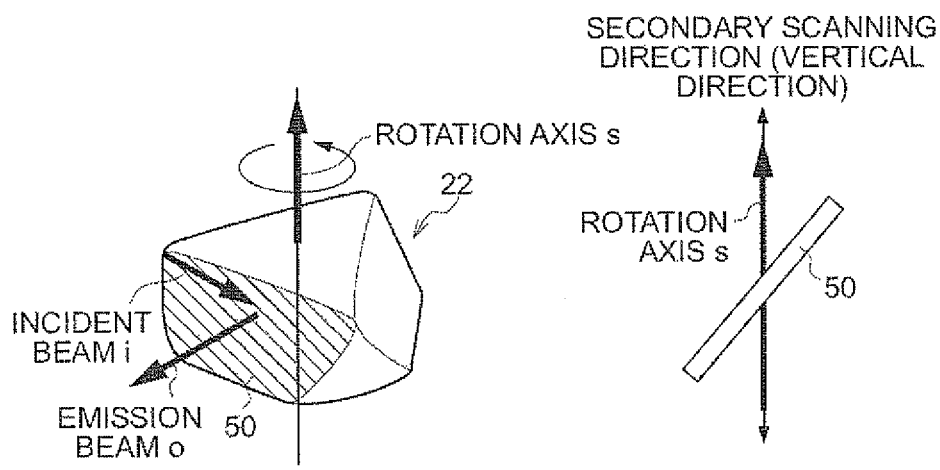
FIG. 6A is a diagram of beam deflector according to a Comparative Example.
Figure 6B:
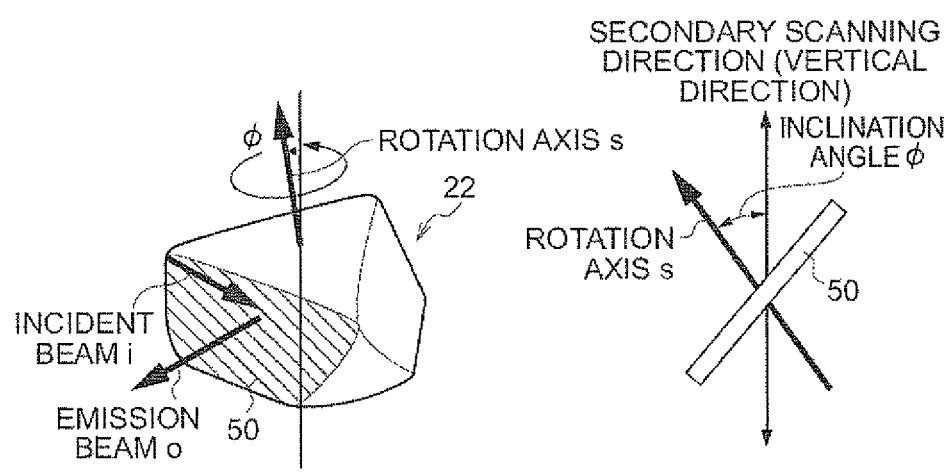
FIG. 6B is a diagram of a beam deflector according to an Example.

FIG. 6A illustrates a beam deflector according to a Comparative Example, and FIG. 6B is illustrates a beam deflector according to an Example. Note that while a "three faced polygon mirror" is illustrated in FIG. 6A and FIG. 6B, explanation is given of the relationship between the incident angle $\theta$ and the inclination angle $\phi$, with the simulation results that follow for a case in which a four-faced polygon mirror is employed.

Whereas in FIG. 6A the rotation axis s of the beam deflector 22 is parallel to the vertical direction, in FIG. 6B the rotation axis s of the beam deflector 22 is tilted with an inclination angle $\phi$ from the vertical direction. The angle formed between the reflecting surface 50 and the vertical direction is substantially fixed, irrespective of the size of the inclination angle $\phi$. Namely, the reflecting surface 50 is not tilted by tilting together with the rotation axis s of the beam deflector 22, but the value of the inclination angle $\phi$ of the rotation axis s is set according to the tilt of the reflecting surface 50 (namely the incident angle $\theta$).

In FIG. 6A the incident angle $\theta=15°$ and the inclination angle $\phi=0°$, and in FIG. 6B the incident angle $\theta=15°$ and the inclination angle $\phi=12°$. The value of the inclination angle $\phi$ of the rotation axis s is optimized according to the value of the incident angle $\theta$. The reflecting surface 50 is tilted by 15° to the vertical direction. The incident beam i incident to the reflecting surface 50 with an incident angle $\theta=15°$ is reflected by the reflecting surface 50 and the emission beam o is emitted in a horizontal direction.

Figure 7A:
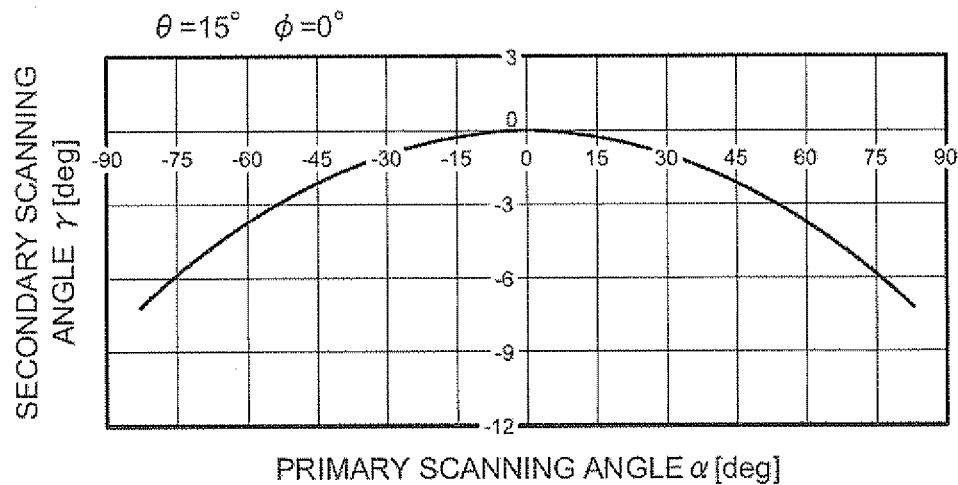
FIG. 7A and FIG. 7B are graphs of plots of the emission directions of respective scanning beams.
Figure 7B:
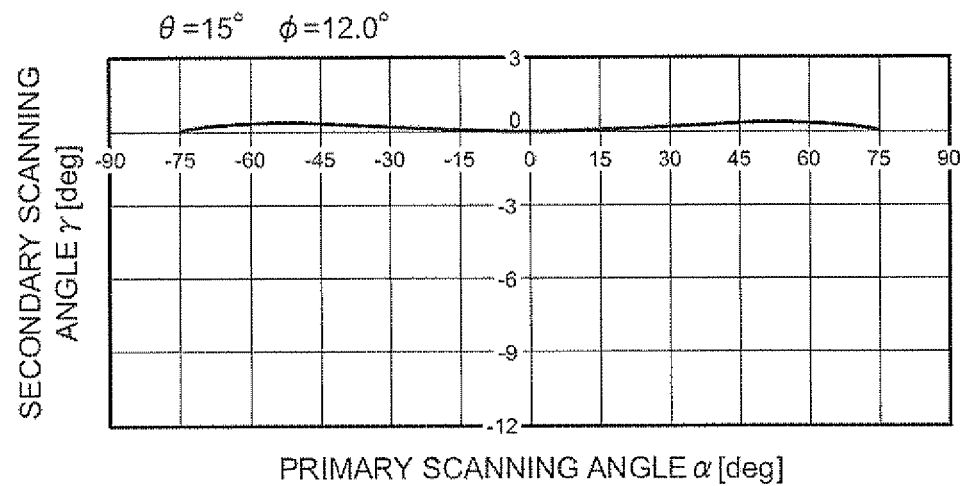

FIG. 7A and FIG. 7B are graphs of plots of the emission direction of the scanning beam. The graph in FIG. 7A corresponds to the Comparative Example of FIG. 6A, and the graph in FIG. 7B corresponds to the Example of FIG. 6B. Namely, the emission direction of the scanning beam has a primary scanning direction component and a secondary scanning direction component, and can be split into a primary scanning angle $\alpha$ in the primary scanning direction and a secondary scanning angle $\gamma$ in the secondary scanning direction. The primary scanning direction component (primary scanning angle $\alpha$) is shown in units of degrees (°) on the horizontal axis and the secondary scanning direction component (secondary scanning angle $\gamma$) is shown on the vertical axis, in units of degrees (°). For emitting the scanning beam in the horizontal direction, the "secondary scanning angle $\gamma=0$", and when the scanning beam is emitted in a direction that is not a horizontal direction then the "secondary scanning angle $\gamma \neq 0$". The secondary scanning angle $\gamma$ corresponds to the "elevation angle" and when the value of the secondary scanning angle $\gamma$ is fixed then this is a case of "fixed elevation angle".

As shown in FIG. 7A, deviation occurs with the secondary scanning direction component of the scanning beam increasing at portions at both ends of the scanning range, such that the scanning beam starts to faces below the horizontal plane. Namely, the desired scanning path trace of "fixed elevation angle" is not achieved, and the scanning path trace of the scanning beam is distorted. In this example the beam deflector 22 (namely the reflecting surface 50) is rotated over the range of ± about 45°, and the full scan angle $\beta$ is about 160°. The secondary scanning angle $\gamma$ is small, about 0.5°, while the primary scanning angle $\alpha$ is in the range of ±15°. In contrast, at the range of a primary scanning angle $\alpha$ at ±80°, the secondary scanning angle $\gamma$ becomes large, at about 7°. This results in the plot of the emission direction of the scanning beam tracing out a convex curve pointing upwards on the graph.

However, as can be seen from FIG. 7B, when the inclination angle $\phi$ is optimized according to the incident angle $\theta$, the scanning beam always faces in a horizontal direction over the entire scanning range. Namely, the desired scanning path trace of "fixed elevation angle" can be achieved. In this example, the beam deflector 22 (namely the reflecting surface 50) is rotated over the range of ± about 45°, and the full scan angle $\beta$ is about 150°. The secondary scanning angle $\gamma$ can be suppressed to a small value of about 0.5° or less over range of a full angle scan of a primary scanning angle $\alpha$ of ±75°. As a result, the emission direction of the scanning beam plotted on the graph traces out a substantially straight line extending along the horizontal axis at the straight line where the secondary scanning angle $\gamma=0$.

Figure 8A:
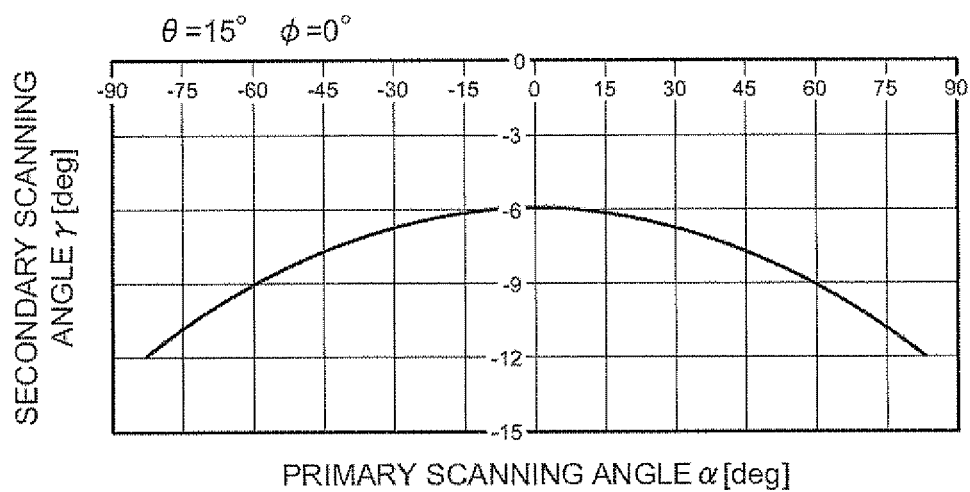
FIG. 8A and FIG. 8B are graphs of plots of the emission directions of respective scanning beams.
Figure 8B:
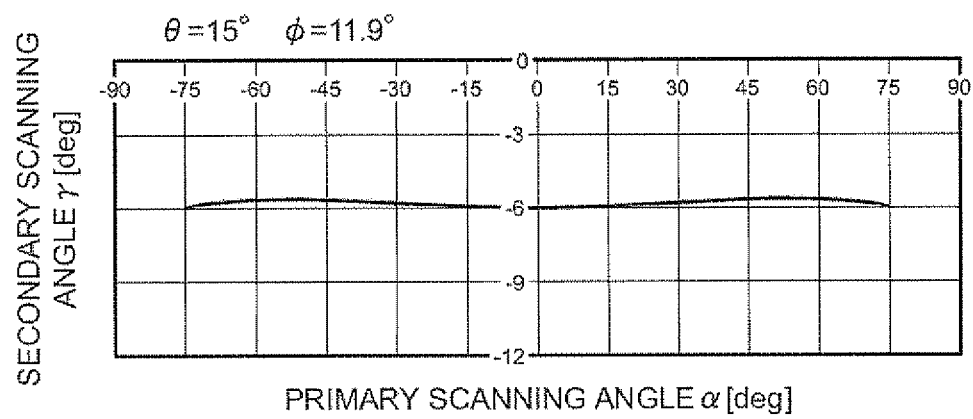

FIG. 8A and FIG. 8B are graphs in which the emission direction of scanning beams is plotted. The graph of FIG. 8A corresponds to the Comparative Example of FIG. 6A, and the graph of FIG. 8B corresponds to the Example of FIG. 6B. In these graphs, as shown in FIG. 4C, the "reference direction" is the vertical direction perpendicular to the road surface and the "specific scanning direction" of the scanning beam is a direction facing below the horizontal plane. The "desired scanning path trace" is "fixed elevation angle". "Fixed elevation angle" here is with the secondary scanning angle $\gamma$ corresponding to the "elevation angle" fixed at $\gamma=6°$.

As shown in FIG. 8A, scanning path trace of the scanning beam is distorted when the incident angle $\theta=15°$ and the inclination angle $\phi=0°$. In contrast thereto, as shown in FIG. 8B, when the incident angle $\theta=15°$ and the inclination angle $\phi=1.9°$, namely when the inclination angle $\phi$ ($\neq 0$) is set optimized according to the incident angle θ, the desired scanning path trace of fixed elevation angle can be obtained, with the scanning beam constantly facing in a specific direction (the direction in which the secondary scanning angle γ=6°) over the full scan range.

Scanning Path Trace Distortion Cause and Principle of Correction

Figure 9:
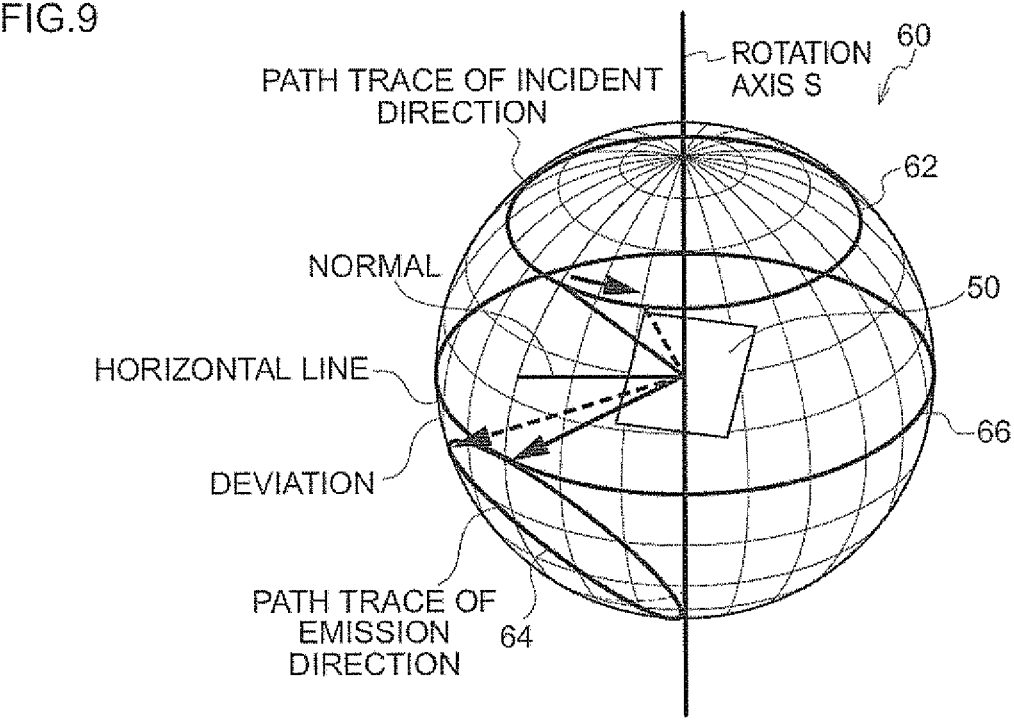
FIG. 9 is a diagram for explaining scanning path trace distortion cause.

FIG. 9 is an explanatory diagram of scanning path trace distortion cause. In an actual light scanning apparatus, the light source is disposed in a fixed position, and a reflecting surface is rotated with the rotation of a rotating reflecting body. However, explanation will be given by considering the configuration to be one in which the reflecting surface is fixed, and the incident direction of an incident beam from the light source incident onto the reflecting surface is rotated. Clearly this approach for explanation is valid when the relative relationship between the incident beam and the reflecting surface is considered.

Envisage, as shown in FIG. 9, a spherical body 60 that rotates about the rotation axis s. The rotation axis s is parallel to the vertical direction with the inclination angle ϕ=0. As illustrated in FIG. 9 with the upper arrow, the spherical body 60 rotates in the anticlockwise direction, as viewed from above. The spherical body 60 is a spherical body like a globe with is axis of rotation corresponding to the rotation axis s, north pole at the top and south pole at the bottom. Fine lines are shown modeling latitude lines and longitude lines. The reflecting surface 50 is disposed at a central portion of the spherical body 60.

The light emitted from the light source is incident onto the reflecting surface 50 obliquely from above. When modeled with the incident direction of the incident beam rotating, the origin point of the incident beam i moves along a line of latitude further to the north pole side than the equator, and the incident direction traces out a circular arc 62 with the rotation axis s at the center. The circular arc 62 is the path trace of the incident direction. The emission direction of the reflected emission beam o is symmetrical to the incident direction of the incident beam i about the normal to the reflecting surface 50. Consequently, the emission direction also traces a circular arc 64, similar to that of the incident direction. The circular arc 64 is the path trace of the emission direction. Accompanying rotation of the incident direction (namely accompanying rotation of the reflecting surface), the origin point of the incident beam i moves in the direction of the upper arrow. The incident beam i and the reflected beam o prior to rotation are indicated by solid lines, and the incident beam i and the reflected beam o after rotation are shown by broken lines.

The rotation axis s here is parallel to the vertical direction, and the emission direction of the reflected beam o prior to rotation is shown with a solid line. The desired scanning path trace 66 over the full scan range is one in which the scanning beam always faces in a horizontal direction, and the elevation angle=0° (is fixed). The circular arc 64 is, as stated above, the emission direction. Accordingly, the emission direction of the reflected beam o after rotation, shown by the intermittent line, intersects with the horizontal direction, deviating from the desired scanning path trace 66. This is caused due to reflection with the reflecting surface 50 disposed at an angle when the rotation axis s has an inclination angle ϕ=0° distorting the scanning path trace.

Figure 10:
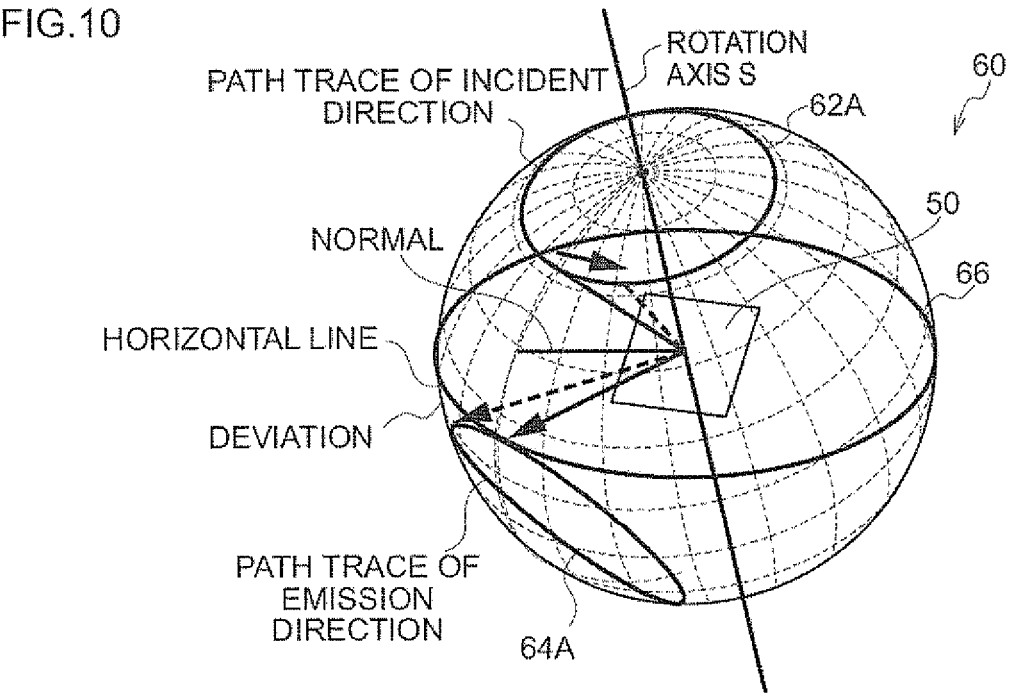
FIG. 10 is a diagram for explaining the principle of scanning path trace distortion correction.

FIG. 10 is an explanatory diagram of the principle of correcting scanning path trace distortion. Similarly to FIG. 9, the reflecting surface 50 is disposed at a central portion of the spherical body 60 that rotates about the rotation axis s. In order to correct scanning path trace distortion, the rotation axis s is tilted to a predetermined inclination angle ϕ (≠0) with respect to the vertical direction. When the incident direction of the incident beam rotates, the origin point of the incident beam i moves along a line of latitude and the incident direction traces the circular arc 62A centered on the rotation axis s.

In order for the emission direction to also trace a circular arc 64A similar to that of the incident direction, the emission direction of the reflected beam o after rotation, shown by the broken line, would have to intersect with the horizontal direction, deviation would have to occur from the desired scanning path trace 66. However, due to the origin point of the incident beam i actually moving along a "tilted line of latitude", the rotation axis s inclination angle ϕ (≠0) is appropriately set according to the incident angle θ such that the latitude line tilt cancels out the deviation from the desired scanning path trace 66. This is the principle by which the rotation axis s is tilted to correct scanning path trace distortion.

Method of Optimizing the Inclination Angle ϕ

Explanation now follows regarding an example of a method for deriving the inclination angle ϕ according to the incident angle θ. Explanation here is of a case of obtaining a desired scanning path trace with elevation angle=0° (fixed) with the scanning beam always facing in a horizontal direction throughout the full scan range. The required condition for the emission beam o from the beam deflector 22 to be emitted in a substantially horizontal direction is, put simply, that the inner product of the vector representing the emission beam o and the vector representing the vertical direction is zero. However, in a system in which the normal direction to the reflecting surface 50 variously changes, it is difficult to analytically derive the inclination angle ϕ corresponding to the incident angle θ to satisfy the above condition. An example will now be given of an approximating method for deriving the inclination angle ϕ with the target of obtaining the desired scanning path trace with fixed elevation angle over the full scan range.

As described above, disposing the laser beam source 20 and the beam deflector 22 are in specific positions determines the intersection angle with which the reflecting surface 50 intersects with the vertical direction, and also determines the value of the incident angle θ of the incident beam i onto the reflecting surface 50. The intersection angle of the reflecting surface 50 with respect to the vertical direction is fixed, irrespective of the inclination angle ϕ of the rotation axis s. Consequently, by applying constants for the rotation angle of the reflecting surface 50 and the incident angle θ, the secondary scanning angle γ of the emission direction of the scanning beam becomes a function of the inclination angle ϕ and the primary scanning angle α. In order to approximate to the desired scanning path trace, the total sum of the secondary scanning angle γ, this being the deviation, over the full scan range should be made as small as possible, and various known methods can be applied as the method for deriving the inclination angle ϕ.

For example, over the full scan range (for a given primary scanning angle α), the inclination angle ϕ may be derived with a least square method so as to minimize the sum of the squares of the secondary scanning angle γ values. Alternatively, an upper limit value of the secondary scanning angle γ, this being the deviation, may be derived, and the range of the primary scanning angle α in which the secondary scanning angle γ does not exceed this upper limit value set as the full scan range. Alternatively, prior conditions may be set in order to derive an inclination angle ϕ with a secondary scanning angle γ=0° at one or plural mirror rotation angles (reference points). For example, in the example shown in FIG. 7B, reference points are set as the three at mirror rotation angles 0° and at ±45°, and the secondary scanning angle γ is 0° at these three mirror rotation angles.

Figure 11:
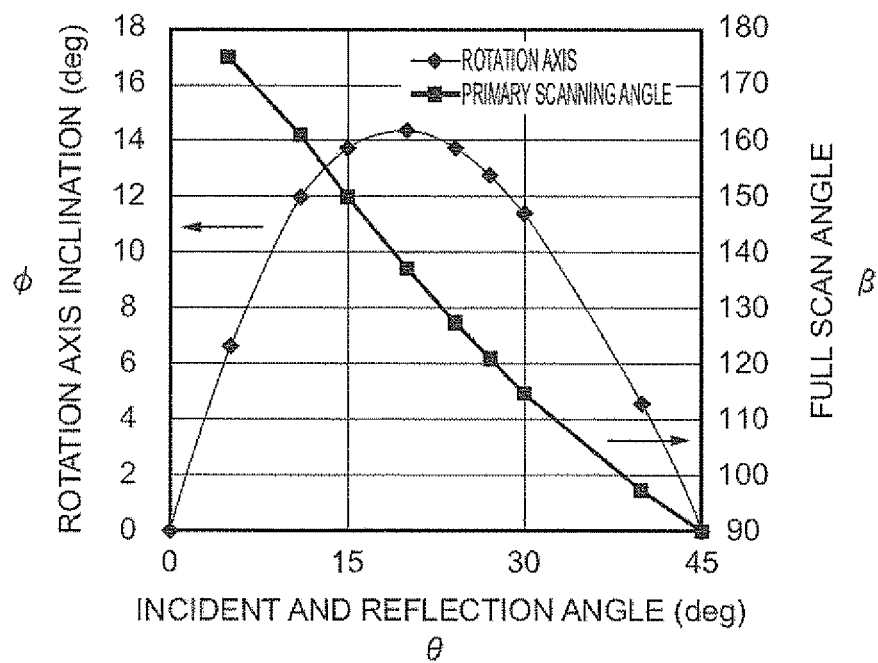
FIG. 11 is a graph showing plots of inclination angle φ and full scan angle β against incident angle θ.

FIG. 11 is a graph illustrating a plot of the inclination angle φ and the full scan angle β against incident angle θ. The inclination angle φ is plotted with black diamonds, and the full scan angle β is plotted with black squares. Both the inclination angle φ and the full scan angle β are obtained by a similar method to that of the example shown in FIG. 7B. The incident angle (incident and reflection angle) θ is shown on the horizontal axis in units of degrees (°) and the inclination angle φ is shown in units of degrees (°) on the vertical axis (on the left hand side). The full scan angle β is shown in units of degrees (°) on the vertical axis (on the right hand side). For example, at the full scan angle β=150° the incident angle θ=15°, and the optimized value at the incident angle θ=15° is an inclination angle φ=13.8°.

Figure 12:
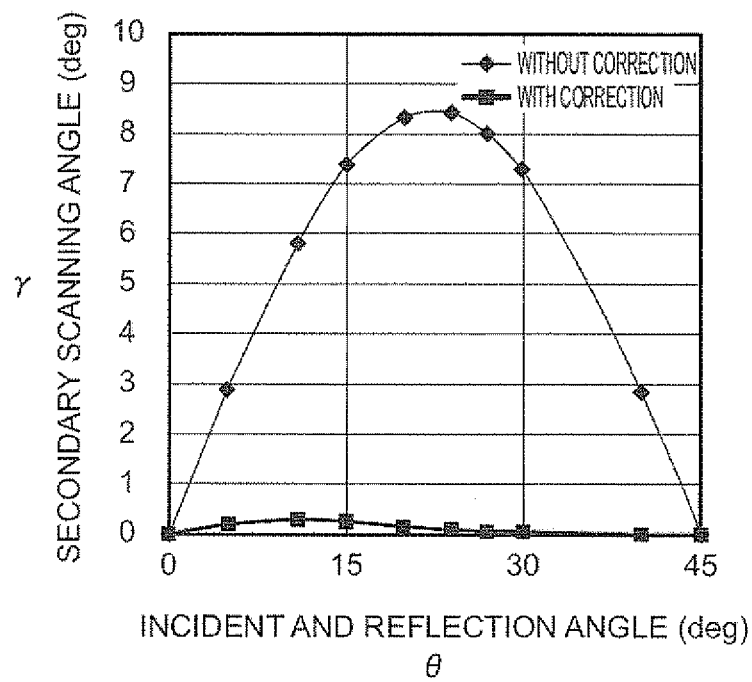
FIG. 12 is a graph showing scanning path trace distortion correction effect from inclination angle φ optimization.

FIG. 12 is a graph showing a scanning path trace distortion correction effect by optimization of the inclination angle φ. Results without distortion correction are plotted by black diamonds, and results with distortion correction are plotted with black squares. The incident angle (incident and reflection angle) θ is shown on the horizontal axis in units of degrees (°). The secondary scanning angle γ is shown in units of degrees (°) on the horizontal axis.

As shown in FIG. 12, when the incident angle θ=0° (the incident beam i is incident from a horizontal direction) and when the incident angle θ=45° (the incident beam i is incident at 45° obliquely from above), the value of the secondary scanning angle γ is substantially 0°, irrespective of whether or not there is distortion correction. However, a secondary scanning angle γ occurs with a maximum value of 8.5° when no distortion correction is performed outside these ranges, namely, in the range from 0°<incident angle θ<45°. In contrast, due to correction being performed when the value of the inclination angle φ of the rotation axis is set to an appropriate value, the secondary scanning angle γ is suppressed to 0.5° or less even in the range from 0°<incident angle θ<45°, and a desired scanning path trace of fixed elevation angle can be achieved over the full scan range.

Modified Example of Beam Deflector

Figure 13B:
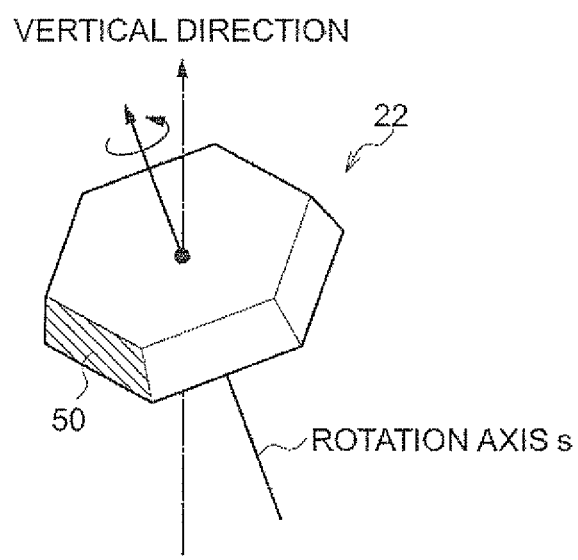

An example is described above in which a rotating multifaceted mirror is employed as the beam deflector 22. In the example described above a four-faced polygon mirror is employed as such a rotating multifaceted mirror, however configuration may be made such that the shape of the rotating multifaceted mirror, the number of reflecting surfaces and the angle of tilt can be changed as appropriate according to the scanning purpose. For example, configuration may be made employing a three-faced polygon mirror equipped with three reflecting surfaces 50 of equal angle of tilt, as shown in the diagrams in FIGS. 6A and 6B, or a six-faced polygon mirror equipped with six reflecting surfaces 50 of equal angle of tilt, as shown in FIG. 13B, as the beam deflector 22.

When a rotating reflection body equipped with plural reflecting surfaces is employed, plural beams disposed along the top-bottom direction can be scanned by making the angle of inclination of the plural reflecting surfaces (referred to as "tilt angle" for a rotating multifaceted mirror) different from each other, enabling two-dimensional scanning to be performed. When employed as a light scanning apparatus for the detection of obstacles, such as in a laser radar apparatus, the detection precision can be raised by performing two-dimensional scanning.

For example, with respect to the three-faced polygon mirror shown in FIG. 6A and FIG. 6B, three-line scanning can be performed by setting each of the three reflecting surfaces with a different tilt angle to scan with the three lines of beams disposed along the top-bottom direction. In such cases a desired scanning path trace can be set for each of the three lines of scanning beam.

Figure 14:
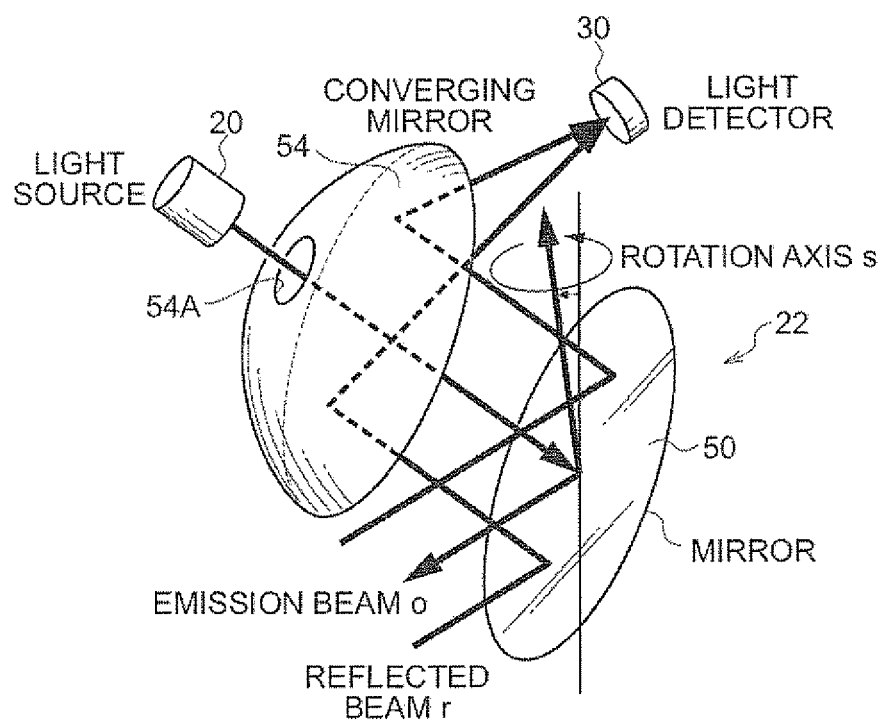
FIG. 14 is a perspective view showing an example of a specific configuration of a separation distance measurement apparatus.

Example of a Specific Configuration of a Separation Distance Measurement Apparatus FIG. 14 is a perspective view showing an example of a specific configuration of a separation distance measurement apparatus, such as in a vehicle mounted laser radar apparatus. As stated above, the light output section 12, serving as a light scanning apparatus, is equipped with the laser beam source 20, and the beam deflector 22 provided with the tilted reflecting surface 50 and functioning as a rotating reflection body. Configuration of the laser radar apparatus 10 illustrated in FIG. 1 includes the light detection section 16, the light converging lens 28 for converging reflected light, and the light detector 30 for detecting the reflected light that has been converged by the light converging lens 28. Note that in the following, with respect to the drive control system, since configuration is similar to that of FIG. 1 further explanation will be omitted.

In contrast, in the configuration example illustrated in FIG. 14, a converging mirror 54 for converging reflected light is provided instead of the light converging lens 28 of the light detection section 16. The converging mirror 54 is configured by a parabolic mirror (concave faced mirror) equipped with a concave parabolic plane with a reflecting surface on the inside. An aperture 54A is provided in the converging mirror 54 for letting a portion of the laser beam pass through. The converging mirror 54 configured by the concave face mirror is disposed between the laser beam source 20 and the beam deflector 22. The converging mirror 54 is disposed at a position substantially facing the reflecting surface 50 such that the reflected light r from the obstacle 14 is reflected by the reflecting surface 50 of the beam deflector 22 and incident on the converging mirror 54.

In the specific configuration illustrated in FIG. 14, the laser beam emitted from the laser beam source 20 passes through the aperture 54A of the converging mirror 54, and is illuminated onto the reflecting surface 50 of the beam deflector 22. The laser beam reflected by the reflecting surface 50 is emitted as the scanning beam (emission beam o) from the light output section 12. The scanning beam emitted from the light output section 12 is illuminated towards the surface to be scanned. Laser light reflected by any obstacles present in the monitoring region is illuminated as the reflected light r onto the reflecting surface 50 of the beam deflector 22. The laser light reflected towards the converging mirror 54 by the reflecting surface 50 is converged by the converging mirror 54 and detected with the light detector 30.

Namely, in the configuration example shown in FIG. 14, converging of reflected light is performed by the reflecting surface 50 of the beam deflector 22 of the light output section 12 and the converging mirror 54 of the light detection section 16. In such a configuration, at the same time as scanning with the emission beam, the reception field is coupled thereto and scanned. The size of the light detector 30 can accordingly be made more compact, and the light reception sensitivity can be raised. A wider angle can be achieved while still avoiding a corresponding fall in light reception sensitivity, and light reception sensitivity can also be maximized, particularly at the central region of the full scan range.

What is claimed is:
1. A light scanning apparatus comprising:
a light source for emitting light in a direction different from a reference direction and different from a direction orthogonal to the reference direction; and a rotating reflection body that rotates about a rotation axis inclined at an inclination angle φ to the reference direction and comprises at least one reflecting surface that is disposed in a direction intersecting obliquely with the rotation axis and reflects light from the light source incident on the reflecting surface at an incident angle θ, wherein, a target scanning direction is a direction intersecting with the reference direction at a predetermined angle thereto, the inclination angle φ is predetermined according to the incident angle θ such that the inclination angle φ≠0° and deviation of a scanning beam reflected by the reflecting surface from the target scanning direction is smaller than the deviation of the scanning beam from the target scanning direction that would be obtained if the inclination angle φ of the rotation axis=0°, an angle with which the reflecting surface intersects the rotation axis is set according to the incident angle θ such that the deviation of the scanning beam reflected by the reflecting surface from the target scanning direction is smaller than the deviation of the scanning beam from the target scanning direction that would be obtained if the angle with which the reflecting surface intersects the rotation axis=0°, and an angle with which the reflecting surface intersects the reference direction remains fixed as the rotation axis is tilted to change the inclination angle θ.

2. The light scanning apparatus of claim 1, wherein the inclination angle φ is predetermined according to the incident angle θ such that an elevation angle is substantially fixed when the reference direction is the vertical direction and the scanning direction is in the horizontal direction or a direction either above or below the horizontal direction, and the angle with which the reflecting surface intersects the rotation axis is set according to the incident angle θ such that the deviation of the scanning beam reflected by the reflecting surface from the substantially fixed elevation angle is minimized.

3. The light scanning apparatus of claim 1, wherein the inclination angle φ is predetermined according to the incident angle θ such that a bearing angle is substantially fixed when the reference direction is the horizontal direction and the scanning direction is in the vertical direction, and the angle with which the reflecting surface intersects the rotation axis is set according to the incident angle θ such that the deviation of the scanning beam reflected by the reflecting surface from the substantially fixed bearing angle is minimized.

4. The light scanning apparatus of claim 1, wherein the rotation axis is within a plane containing the reference direction, and the incident direction of light incident at the incident angle θ onto the reflecting surface.

5. A separation distance measurement apparatus comprising:

a light output section including the light scanning apparatus of claim 1 wherein the light source is a light source for emitting a laser beam;

a light detection section for detecting laser light that has been output from the light output section and reflected by an obstacle present either in front of or to a side of the separation distance measurement apparatus; and a separation distance computation section that computes a separation distance to the obstacle from a delay time of the laser light that was output from the light output section and detected by the light detection section.

6. The separation distance measurement apparatus of claim 5, wherein the light detection section detects the laser light reflected by the obstacle as re-reflected by the rotating reflection body of the light scanning apparatus.

* * * * *

UNITED STATES PATENT AND TRADEMARK OFFICE
CERTIFICATE OF CORRECTION

| | |
|---|---|
| PATENT NO. | : 9,001,312 B2 |
| APPLICATION NO. | : 13/052552 |
| DATED | : April 7, 2015 |
| INVENTOR(S) | : Hiroyuki Matsubara et al. |

It is certified that error appears in the above-identified patent and that said Letters Patent is hereby corrected as shown below:

In the Claims

Col. 15, Ln. 28, Claim 1: change the last term from "inclination angle $\theta$" to -- inclination angle $\varphi$ --

Signed and Sealed this
First Day of September, 2015

Michelle K. Lee
*Director of the United States Patent and Trademark Office*